(12) United States Patent
Cho et al.

(10) Patent No.: US 11,155,155 B2
(45) Date of Patent: Oct. 26, 2021

(54) POWER TRANSMISSION SYSTEM OF VEHICLE

(71) Applicants: Hyundai Motor Company, Seoul (KR); Kia Motors Corporation, Seoul (KR)

(72) Inventors: Wonmin Cho, Hwaseong-si (KR); Seongwook Ji, Gunpo-si (KR); Hyun Sik Kwon, Seoul (KR); Seong Wook Hwang, Gunpo-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 534 days.

(21) Appl. No.: 16/111,040

(22) Filed: Aug. 23, 2018

(65) Prior Publication Data
US 2019/0202280 A1     Jul. 4, 2019

(30) Foreign Application Priority Data
Dec. 28, 2017   (KR) .......................... 10-2017-0182955

(51) Int. Cl.
| | |
|---|---|
| *B60K 6/36* | (2007.10) |
| *B60K 6/543* | (2007.10) |
| *F16H 37/06* | (2006.01) |
| *B60K 6/547* | (2007.10) |
| *B60K 6/48* | (2007.10) |

(Continued)

(52) U.S. Cl.
CPC ............... *B60K 6/543* (2013.01); *B60K 6/36* (2013.01); *B60K 6/48* (2013.01); *B60K 6/547* (2013.01); *F16D 21/06* (2013.01); *F16H 3/006* (2013.01); *F16H 3/093* (2013.01); *F16H 9/18* (2013.01); *F16H 37/065* (2013.01); *B60K 2006/4825* (2013.01); *B60K 2006/541* (2013.01)

(58) Field of Classification Search
CPC ............ B60K 6/36; B60K 6/48; B60K 6/543; B60K 6/547; F16H 3/006; F16H 3/093; F16H 37/021
See application file for complete search history.

(56) References Cited

FOREIGN PATENT DOCUMENTS

| | | | |
|---|---|---|---|
| JP | 2010-261544 | * | 11/2010 |
| JP | 4704494 B2 | | 6/2011 |

(Continued)

*Primary Examiner* — William C Joyce
(74) *Attorney, Agent, or Firm* — Morgan, Lewis & Bockius LLP

(57) ABSTRACT

A power transmission system of a vehicle may include: a first input shaft selectively connectable to an engine output through a first clutch; a second input shaft selectively connectable to the engine output through a second clutch; a first intermediate shaft; a second intermediate shaft; an output shaft disposed in parallel with and apart from the first intermediate shaft and transmitting power from the first intermediate shaft and the second intermediate shaft to a final reduction gear of a differential apparatus; a motor/generator fixedly connected to any one of the first input shaft and the first intermediate shaft; a continuously variable shifting device operably connecting the first input shaft to the first intermediate shaft; and a plurality of shifting gear sets operably connecting the second input shaft, the first and the second intermediate shaft and the output shaft with each other.

11 Claims, 3 Drawing Sheets

(51) Int. Cl.
  *F16H 3/093*  (2006.01)
  *F16H 3/00*  (2006.01)
  *F16D 21/06*  (2006.01)
  *F16H 9/18*  (2006.01)
  B60K 6/54  (2007.10)

(56) References Cited

FOREIGN PATENT DOCUMENTS

KR  10-1338458 B1 12/2013
KR  10-1588796 B1 1/2016

\* cited by examiner

FIG. 2

| travelling mode | speed stages | CL1 | CL2 | SL | | | MG | note |
| --- | --- | --- | --- | --- | --- | --- | --- | --- |
| | | | | RDG | N | FDG | | |
| EV travelling mode | reverse speed stage (CVT) | - | - | - | ● | - | ■ | MG rotates in negative direction |
| | forward speed stage (CVT) | - | - | - | ● | - | ■ | MG rotates in positive direction |
| engine travelling mode | reverse speed stage | - | △ | ● | - | - | □ | |
| | D (CVT) | △ | - | - | ● | - | □ | |
| | forward speed stage | - | △ | - | - | ● | □ | |

△ : operation
● : position of sleeve
■ : MG operates only(EV)
□ : torque assist of MG

POWER TRANSMISSION SYSTEM OF VEHICLE

CROSS-REFERENCE TO RELATED APPLICATION

The present application claims priority to Korean Patent Application No. 10-2017-0182955 filed on Dec. 28, 2017, the entire contents of which is incorporated herein for all purposes by this reference.

BACKGROUND OF THE INVENTION

Field of the Invention

The present invention relates to a power transmission system of a vehicle. More particularly, the present invention relates to a power transmission system of a vehicle capable of high-efficiency travelling through continuous gear ratio change using a continuously variable shifting device and fixed forward/reverse speeds using a synchronizer.

Description of Related Art

Environmentally-friendly technique of vehicles is very important technique on which survival of future motor industry is dependent. Vehicle makers are focusing on development of environmentally-friendly vehicles to meet environment and fuel consumption regulations.

Furthermore, an automatic transmission achieving more speed stages has been developed for enhancing fuel economy and optimizing drivability. Recently, increase of oil price is triggering a hard competition in enhancing fuel mileage of a vehicle.

Therefore, many researches for reducing weight and enhancing fuel economy through downsizing of an engine and for securing drivability and fuel economy through multiple speed stages of automatic transmissions have been developed.

However, in the automatic transmission, as the number of speed stages increase, the number of internal components (particularly, planetary gear sets) increase, and as a result, a length of the transmission increases. Therefore, mountability, cost, weight, transmission efficiency, and the like may still deteriorate.

Accordingly, development of a transmission which may achieve maximum efficiency with a small number of components may be important in order to increase a fuel economy enhancement effect through the multiple-speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a vehicle having advantages of achieving high-efficiency travelling through continuous gear ratio change using a continuously variable shifting device and fixed forward/reverse speeds using a synchronizer.

A power transmission system of a vehicle according to exemplary embodiments of the present invention may include: a first input shaft selectively connectable to an engine output through a first clutch; a second input shaft enclosing a portion of the first input shaft and selectively connectable to the engine output through a second clutch; a first intermediate shaft disposed in parallel with and apart from the first and the second input shafts; a second intermediate shaft disposed in parallel with and apart from the first and the second input shafts; an output shaft disposed in parallel with and apart from the first intermediate shaft and transmitting power from the first intermediate shaft and the second intermediate shaft to a final reduction gear of a differential apparatus; a motor/generator fixedly connected to any one of the first input shaft and the first intermediate shaft; a continuously variable shifting device operably connecting the first input shaft to the first intermediate shaft; and a plurality of shifting gear sets operably connecting the second input shaft, the first and the second intermediate shaft and the output shaft with each other.

The plurality of shifting gear sets may include: a first shifting gear set including a drive gear fixedly disposed on the second input shaft, and a driven gear fixedly disposed on the second intermediate shaft and engaged with the drive gear; a second shifting gear set including a forward speed drive gear rotatably disposed on the second intermediate shaft, and a forward speed driven gear fixedly disposed on the first intermediate shaft and engaged with the forward speed drive gear; a third shifting gear set including a reverse speed drive gear rotatably disposed on the second intermediate shaft, and a reverse speed driven gear fixedly disposed on the output shaft and engaged with the reverse speed drive gear; and a fourth shifting gear set including an intermediate output gear fixedly disposed on the first intermediate shaft, and an intermediate input gear fixedly disposed on the output shaft and engaged with the intermediate output gear.

The forward speed drive gear and the reverse speed drive gear may be selectively and operably connected to the second intermediate shaft by a synchronizer.

In one aspect, the motor/generator may be fixedly connected to the first input shaft.

In another aspect, the motor/generator may be fixedly connected to the first intermediate shaft.

A power transmission system of a vehicle according to an exemplary embodiment of the present invention may include: a first input shaft selectively connectable to an engine output through a first clutch; a second input shaft enclosing a portion of the first input shaft and selectively connectable to the engine output through a second clutch; a first intermediate shaft disposed in parallel with and apart from the first and the second input shafts; a second intermediate shaft disposed in parallel with and apart from the first and the second input shafts; an output shaft disposed in parallel with and apart from the first intermediate shaft and transmitting power from the first intermediate shaft and the second intermediate shaft to a final reduction gear of a differential apparatus; a motor/generator fixedly connected to the first input shaft; a continuously variable shifting device operably connecting the first input shaft to the first intermediate shaft; a first shifting gear set including a drive gear fixedly disposed on the second input shaft, and a driven gear fixedly disposed on the second intermediate shaft and engaged with the drive gear; a second shifting gear set including a forward speed drive gear rotatably disposed on the second intermediate shaft, and a forward speed driven gear fixedly disposed on the first intermediate shaft and engaged with the forward speed drive gear; a third shifting gear set including a reverse speed drive gear rotatably disposed on the second intermediate shaft, and a reverse speed driven gear fixedly disposed on the output shaft and engaged with the reverse speed drive gear; and a fourth shifting gear set including an intermediate output gear fixedly disposed on the first intermediate shaft, and an intermediate input gear fixedly disposed on the output shaft and engaged with the intermediate output gear.

The forward speed drive gear and the reverse speed drive gear may be selectively and operably connected to the second intermediate shaft by a synchronizer.

A power transmission system of a vehicle according to another exemplary embodiment of the present invention may include: a first input shaft selectively connectable to an engine output through a first clutch; a second input shaft enclosing a portion of the first input shaft and selectively connectable to the engine output through a second clutch; a first intermediate shaft disposed in parallel with and apart from the first and the second input shafts; a second intermediate shaft disposed in parallel with and apart from the first and the second input shafts; an output shaft disposed in parallel with and apart from the first intermediate shaft and transmitting power from the first intermediate shaft and the second intermediate shaft to a final reduction gear of a differential apparatus; a motor/generator fixedly connected to the first intermediate shaft; a continuously variable shifting device operably connecting the first input shaft to the first intermediate shaft; a first shifting gear set including a drive gear fixedly disposed on the second input shaft, and a driven gear fixedly disposed on the second intermediate shaft and engaged with the drive gear; a second shifting gear set including a forward speed drive gear rotatably disposed on the second intermediate shaft, and a forward speed driven gear fixedly disposed on the first intermediate shaft and engaged with the forward speed drive gear; a third shifting gear set including a reverse speed drive gear rotatably disposed on the second intermediate shaft, and a reverse speed driven gear fixedly disposed on the output shaft and engaged with the reverse speed drive gear; and a fourth shifting gear set including an intermediate output gear fixedly disposed on the first intermediate shaft, and an intermediate input gear fixedly disposed on the output shaft and engaged with the intermediate output gear.

The forward speed drive gear and the reverse speed drive gear may be selectively and operably connected to the second intermediate shaft by a synchronizer.

Since a power transmission system of a vehicle according to exemplary embodiments of the present invention has a first power delivery path where power of an engine is shifted by fixed forward/reverse speeds through a synchronizer and the shifted power is output, a second power delivery path where the power of the engine is shifted by continuous gear ratios through a continuously variable shifting device and the shifted power is output, and a third power delivery path where power of a motor/generator is shifted by continuous gear ratios through the continuously variable shifting device and the shifted power is output, high-efficiency travelling through continuous gear ratio change and the fixed forward/reverse speeds is possible.

Furthermore, since planetary gear sets, clutches and brakes for achieving forward/reverse speeds may be removed from a power transmission system of a vehicle according to exemplary embodiments of the present invention, drag loss may be minimized.

Furthermore, since a length of a power transmission system of a vehicle according to exemplary embodiments of the present invention is greatly shortened, mountability may be improved.

Furthermore, since a motor/generator is fixedly connected to a first intermediate shaft in a power transmission system of an exemplary embodiment of the present invention, torque assist and travelling at electric vehicle mode through gear ratios of gears disposed on the first intermediate shaft and an output shaft is possible.

Furthermore, the effects which may be obtained or predicted by the exemplary embodiment of the present invention will be explicitly or implicitly disclosed in the DETAILED DESCRIPTION of the present invention. That is, various effects which are predicted by the exemplary embodiments of the present invention will be disclosed in the detailed description to be described below.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart at each mode for a power transmission system of a vehicle according to the various exemplary embodiments of the present invention.

Figure 1:
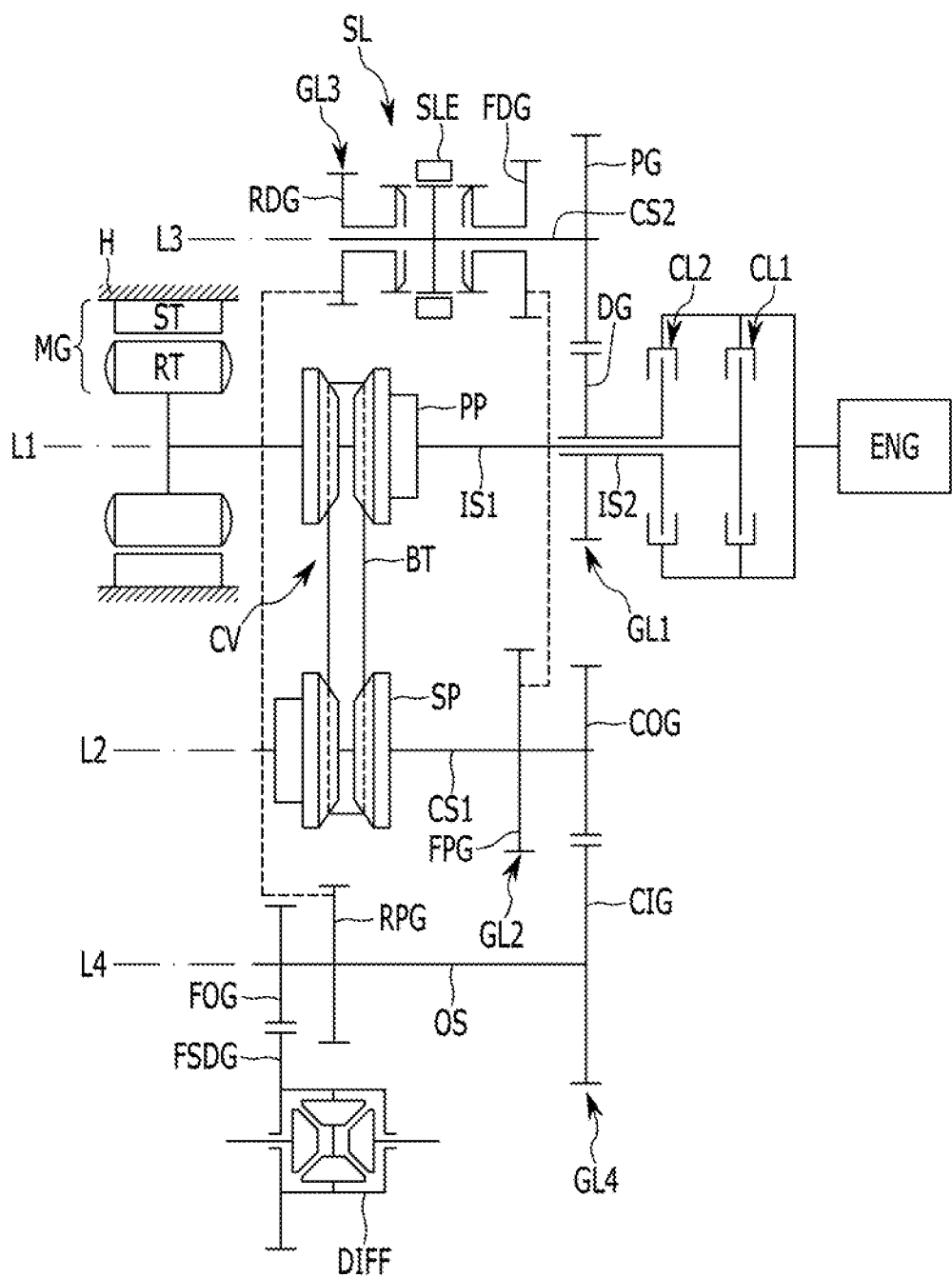
FIG. 1 is a schematic diagram of a power transmission system of a vehicle according to the various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Description of components which are not necessary for explaining the present invention will be omitted, and the same or like constituent elements are denoted by the same reference numerals in the exemplary embodiment of the present invention.

In a detailed description, the components which have the same name are differentiated by ordinal numbers, but are not limited to the sequence.

FIG. 1 is a schematic diagram of a power transmission system of a vehicle according to the various exemplary embodiments of the present invention.

Referring to FIG. 1, a power transmission system of a vehicle according to the various exemplary embodiments of the present invention includes first clutch and second clutch CL1 and CL2, first and second input shafts IS1 and IS2, first and second intermediate shafts CS1 and CS2, a continuously variable shifting device CV, a motor/generator MG, a synchronizer SL, an output shaft OS, and a final reduction gear FSDG of a differential apparatus DIFF.

The first and the second input shafts IS1 and IS2, the first and the second intermediate shafts CS1 and CS2, and the output shaft OS are disposed on first, second, third and fourth axes L1, L2, L3, and L4 which are disposed in parallel and apart from each other.

The first and the second input shafts IS1 and IS2 are disposed on the first axis L1. The first input shaft IS1 is a solid shaft and is selectively connectable to an engine output (crankshaft) through a first clutch CL1. The second input shaft IS2 is a hollow shaft, is disposed at a radial external of the first input shaft IS1 without rotational interference with the first input shaft IS1, and is selectively connectable to the engine output (crankshaft) through a second clutch CL2.

The first clutch and the second clutch CL1 and CL2 that are engagement elements are hydraulic pressure friction engagement devices that are operated by hydraulic pressure from a hydraulic pressure control device. Multi-plates friction elements of wet type are mainly used as the engaging elements, but dog clutches, electric clutches, or magnetic clutches which may be operated by electric signal from an electric control device may be used as the engaging elements.

The continuously variable shifting device CV includes a primary pulley PP disposed on the first input shaft IS1, a secondary pulley SP disposed on the first intermediate shaft CS1, and a metal belt BT connecting the primary pulley PP and the secondary pulley SP.

The primary pulley PP and the secondary pulley SP of the continuously variable shifting device CV include a fixed sheave and a movable sheave, respectively. If the movable sheave applies thrust load according to drive torque to a side of the metal belt BT by a hydraulic pressure control device, diameters of the pulleys PP and SP contacting the metal belt BT change. Therefore, continuously variable shifting may be achieved.

The motor/generator MG functions as a motor and a generator and includes a stator ST fixed to a transmission housing H and a rotor RT rotatably supported at a radial internal of the stator ST. The rotor RT is fixedly connected to the first input shaft IS1.

Therefore, the first intermediate shaft CS1 can receive power of an engine ENG and power of the motor/generator MG converted by continuous gear ratios achieved by the continuously variable shifting device CV.

Furthermore, the second input shaft IS2, the first and the second intermediate shafts CS1 and CS2, and the output shaft OS are operably connected to each other through four shifting gear sets GL1, GL2, GL3, and GL4.

The first shifting gear set GL1 includes a drive gear DG fixedly disposed on the second input shaft IS2, and a driven gear PG fixedly disposed on the second intermediate shaft CS2 and engaged with the drive gear DG.

Therefore, power of the second input shaft IS2 is transmitted to the second intermediate shaft CS2 depending on gear ratios of the drive gear DG and the driven gear PG, and the gear ratios of the drive gear DG and the driven gear PG are set as portions of gear ratios of a forward speed and a reverse speed.

The second shifting gear set GL2 includes a forward speed drive gear FDG rotatably disposed on the second intermediate shaft CS2, and a forward speed driven gear FPG fixedly disposed on the first intermediate shaft CS1 and engaged with the forward speed drive gear FDG.

Therefore, power of the second intermediate shaft CS2 is transmitted to the first intermediate shaft CS1 depending on gear ratios of the forward speed drive gear FDG and the forward speed driven gear FPG, and the gear ratios of the forward speed drive gear FDG and the forward speed driven gear FPG are determined by the gear ratio of the forward speed together with the gear ratios of the drive gear DG and the driven gear PG.

The third shifting gear set GL3 includes a reverse speed drive gear RDG rotatably disposed on the second intermediate shaft CS2, and a reverse speed driven gear RPG fixedly disposed on the output shaft OS and engaged with the reverse speed drive gear RDG.

Therefore, the power of the second intermediate shaft CS2 is transmitted to the output shaft OS depending on gear ratios of the reverse speed drive gear RDG and the reverse speed driven gear RPG, and the gear ratios of the reverse speed drive gear RDG and the reverse speed driven gear RPG are determined by the gear ratio of the reverse speed together with the gear ratios of the drive gear DG and the driven gear PG.

A synchronizer SL is disposed between the forward speed drive gear FDG and the reverse speed drive gear RDG and operably and selectively connects the forward speed drive gear FDG or the reverse speed drive gear RDG to the second intermediate shaft CS2. A sleeve SLE used in the synchronizer SL, as well-known to a person of an ordinary skill in the art, is operated by an additional actuator or and the actuator is controlled by a transmission control device.

The fourth shifting gear set GL4 includes an intermediate output gear COG fixedly disposed on the first intermediate shaft CS1, and an intermediate input gear CIG fixedly disposed on the output shaft OS and engaged with the intermediate output gear COG.

Therefore, power of the first intermediate shaft CS1 is transmitted to the output shaft OS depending on gear ratios of the intermediate output gear COG and the intermediate input gear CIG.

The power transmitted to the output shaft OS is transmitted to a driving axle through the differential apparatus depending on gear ratios of a final output gear FOG fixed to the output shaft OS and the final reduction gear FSDG included in the differential apparatus DIFF and engaged with the final output gear FOG.

FIG. 2 is an operation chart at each mode for a power transmission system of a vehicle according to the various exemplary embodiments of the present invention.

As shown in FIG. 2, the power transmission system according to the various exemplary embodiments of the present invention can achieve an electric vehicle (EV) travelling mode and an engine travelling mode, and the forward/reverse speeds at the EV travelling mode are achieved only by the power of the motor/generator MG.

[Reverse Speed at EV Travelling Mode]

At the reverse speed at the EV travelling mode, a negative rotation speed of the motor/generator MG is transmitted to the final reduction gear FSDG of the differential apparatus DIFF through the continuously variable shifting device CV, the first intermediate shaft CS1, the intermediate output gear COG, the intermediate input gear CIG, the output shaft OS, and the final output gear FOG, and the vehicle travels at the reverse speed.

At the instant time, travelling speed at the reverse speed may be controlled by the negative rotation speed of the motor/generator MG, but may be controlled by continuous gear ratio changes of the continuously variable shifting device CV.

[Forward Speed at EV Travelling Mode]

At the forward speed at the EV travelling mode, a positive rotation speed of the motor/generator MG is transmitted to the final reduction gear FSDG of the differential apparatus DIFF through the continuously variable shifting device CV, the first intermediate shaft CS1, the intermediate output gear COG, the intermediate input gear CIG, the output shaft OS, and the final output gear FOG, and the vehicle travels at the forward speed.

At the instant time, travelling speed at the forward speed may be controlled by the positive rotation speed of the motor/generator MG, but may be controlled by continuous gear ratio changes of the continuously variable shifting device CV.

At the engine travelling mode, the vehicle can travel at the forward/reverse speeds achieved by the synchronizer SL or at the forward speed achieved by the continuously variable shifting device CV. Furthermore, the motor/generator MG can assist torque.

[Reverse Speed Using Synchronizer]

At the reverse speed using the synchronizer, the second clutch CL2 is operated and the sleeve SLE of the synchronizer SL operably connects the second intermediate shaft CS2 and the reverse speed drive gear RDG.

In the instant case, the power of the engine ENG is transmitted to the final reduction gear FSDG of the differential apparatus DIFF through the second clutch CL2, the second input shaft IS2, the drive gear DG, the driven gear PG, the second intermediate shaft CS2, the synchronizer SL, the reverse speed drive gear RDG, the reverse speed driven gear RPG, the output shaft OS, and the final output gear FOG, and the vehicle travels at the reverse speed.

A gear ratio of the reverse speed is a fixed gear ratio determined by the gear ratio of the first shifting gear set GL1, the gear ratio of the third shifting gear set GL3, and the gear ratio of the final output gear FOG and the final reduction gear FSDG.

[Forward Speed Using Synchronizer]

At the forward speed using the synchronizer, the second clutch CL2 is operated and the sleeve SLE of the synchronizer SL operably connects the second intermediate shaft CS2 and the forward speed drive gear FDG.

In the instant case, the power of the engine ENG is transmitted to the final reduction gear FSDG of the differential apparatus DIFF through the second clutch CL2, the second input shaft IS2, the drive gear DG, the driven gear PG, the second intermediate shaft CS2, the synchronizer SL, the forward speed drive gear FDG, the forward speed driven gear FPG, the first intermediate shaft CS1, the intermediate output gear COG, the intermediate input gear CIG, the output shaft OS, and the final output gear FOG, and the vehicle travels at the forward speed.

A gear ratio of the forward speed is a fixed gear ratio determined by the gear ratio of the first shifting gear set GL1, the gear ratio of the second shifting gear set GL2, the gear ratio of the fourth shifting gear set GL4, and the gear ratio of the final output gear FOG and the final reduction gear FSDG.

[Forward Speed Using Continuously Variable Shifting Device]

At the forward speed using the continuously variable shifting device, the first clutch CL1 is operated and the synchronizer SL maintains a neutral state.

In the instant case, the power of the engine ENG is transmitted to the final reduction gear FSDG of the differential apparatus DIFF through the first clutch CL1, the first input shaft IS1, the continuously variable shifting device CV, the first intermediate shaft CS1, the intermediate output gear COG, the intermediate input gear CIG, the output shaft OS, and the final output gear FOG, and the vehicle travels at the forward speed.

At the instant time, a travelling speed at the forward speed is controlled by continuous gear ratio changes of the continuously variable shifting device CV.

Figure 3:
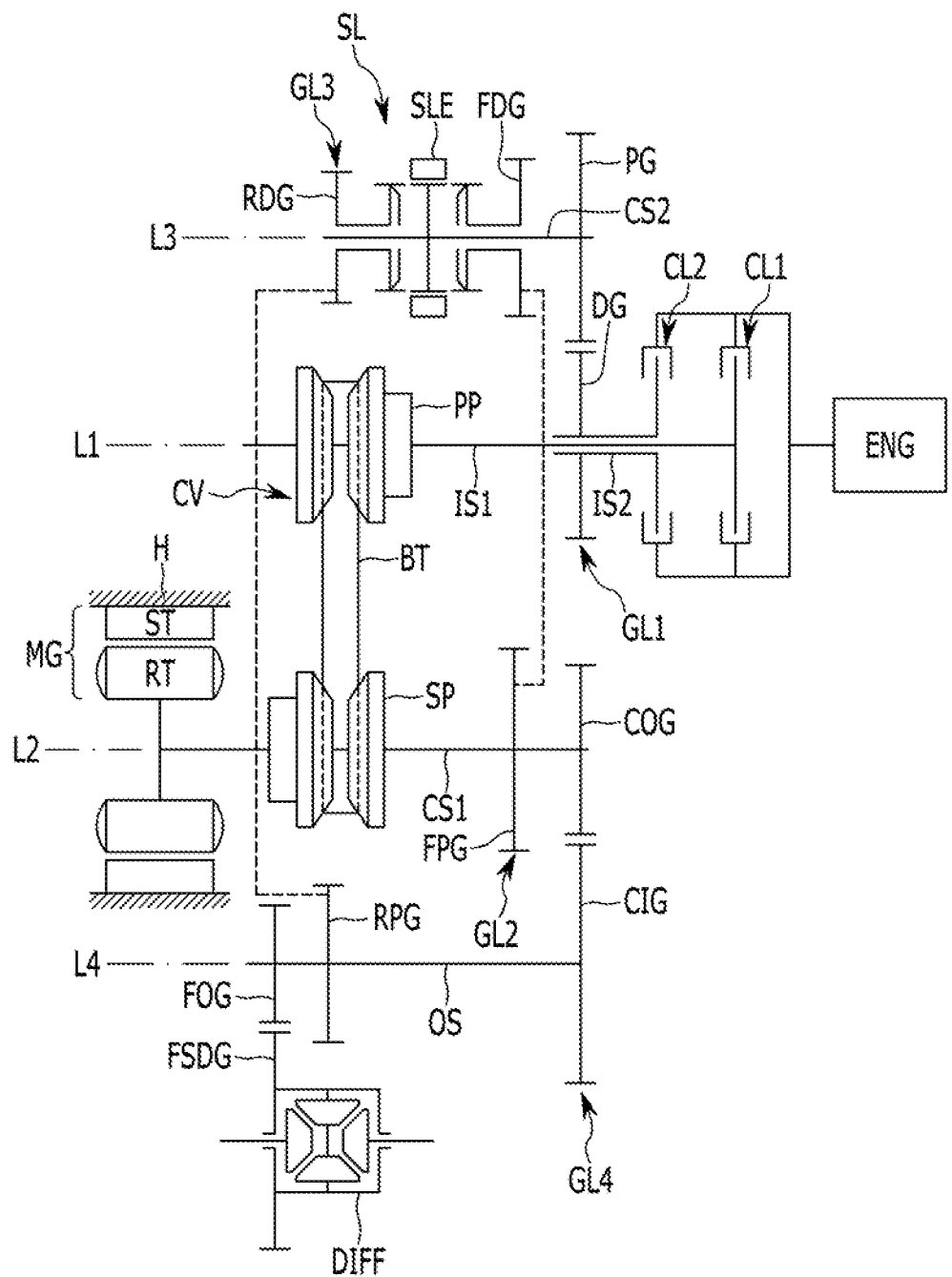
FIG. 3 is a schematic diagram of a power transmission system of a vehicle according to the various exemplary embodiments of the present invention.

FIG. 3 is a schematic diagram of a power transmission system of a vehicle according to the various exemplary embodiments of the present invention.

Referring to FIG. 1 and FIG. 3, the motor/generator MG is fixedly connected to the first input shaft IS1 in the power transmission system according to the various exemplary embodiments of the present invention, or the motor/generator MG is fixedly connected to the first intermediate shaft CS1 according to the various exemplary embodiments.

Therefore, the power of the motor/generator MG is directly transmitted to the first intermediate shaft CS1 without passing the continuously variable shifting device CV in the power transmission system of a vehicle according to the various exemplary embodiments of the present invention. Therefore, the travelling speed at the EV travelling mode is determined only by the positive/negative rotation speed of the motor/generator MG.

Since the other components and shifting process of the power transmission system according to the various exemplary embodiments of the present invention are the same as those of the power transmission system according to the various exemplary embodiments of the present invention except a position of the motor/generator MG and power delivery path, detailed description thereof will be omitted.

Since the power transmission system of a vehicle according to the exemplary embodiments of the present invention has a first power delivery path where the power of the engine is shifted by the fixed forward/reverse speeds through the synchronizer SL and the shifted power is output, a second power delivery path where the power of the engine is shifted by continuous gear ratios through the continuously variable shifting device CV and the shifted power is output, and a third power delivery path where the power of the motor/generator MG is shifted by continuous gear ratios through the continuously variable shifting device CV and the shifted power is output.

Therefore, high-efficiency travelling through the continuous gear ratio changes using the continuously variable shifting device and the fixed forward/reverse speeds using the synchronizer SL is possible according to the exemplary embodiments of the present invention.

Since planetary gear sets, clutches and brakes for achieving forward/reverse speeds may be removed from the power transmission system of a vehicle according to the exemplary embodiments of the present invention, drag loss may be minimized.

Furthermore, since a length of the power transmission system of a vehicle according to the exemplary embodiments of the present invention is greatly shortened, mountability may be improved.

Furthermore, since the motor/generator is fixedly connected to the first intermediate shaft in the power transmission system of the various exemplary embodiments of the present invention, torque assist and travelling at electric vehicle mode through gear ratios of gears disposed on the first intermediate shaft and an output shaft is possible.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmitting apparatus of a vehicle, the power transmitting apparatus comprising:
    a first input shaft selectively connectable to an engine output through a first clutch;
    a second input shaft enclosing a portion of the first input shaft and selectively connectable to the engine output through a second clutch;
    a first intermediate shaft mounted apart from the first and the second input shafts;
    a second intermediate shaft mounted apart from the first and the second input shafts;
    an output shaft mounted apart from the first intermediate shaft and transmitting power from the first intermediate shaft and the second intermediate shaft to a final reduction gear of a differential apparatus;
    a motor/generator fixedly connected to a transmission housing and coupled to one of the first input shaft and the first intermediate shaft;
    a continuously variable shifting device operably connecting the first input shaft to the first intermediate shaft; and
    a plurality of shifting gear sets operably connecting the second input shaft, the first and the second intermediate shaft and the output shaft with each other,
    wherein the plurality of shifting gear sets comprises:
    a first shifting gear set including a drive gear fixedly mounted on the second input shaft, and a driven gear fixedly mounted on the second intermediate shaft and engaged with the drive gear;
    a second shifting gear set including a forward speed drive gear rotatably mounted on the second intermediate shaft, and a forward speed driven gear fixedly mounted on the first intermediate shaft and engaged with the forward speed drive gear;
    a third shifting gear set including a reverse speed drive gear rotatably mounted on the second intermediate shaft, and a reverse speed driven gear fixedly mounted on the output shaft and engaged with the reverse speed drive gear; and
    a fourth shifting gear set including an intermediate output gear fixedly mounted on the first intermediate shaft, and an intermediate input gear fixedly mounted on the output shaft and engaged with the intermediate output gear.

2. The power transmitting apparatus of claim 1, wherein the forward speed drive gear and the reverse speed drive gear are selectively and operably connected to the second intermediate shaft by a synchronizer.

3. The power transmitting apparatus of claim 1, wherein the motor/generator is fixedly connected to the first input shaft.

4. The power transmitting apparatus of claim 1, wherein the motor/generator is fixedly connected to the first intermediate shaft.

5. The power transmitting apparatus of claim 1, wherein the continuously variable shifting device includes a primary pulley fixed to the first input shaft and a secondary pulley fixed to the first intermediate shaft, and wherein the primary pulley and the secondary pulley are engaged to each other.

6. A power transmitting apparatus of a vehicle, the power transmitting apparatus comprising:
    a first input shaft selectively connectable to an engine output through a first clutch;
    a second input shaft enclosing a portion of the first input shaft and selectively connectable to the engine output through a second clutch;
    a first intermediate shaft mounted apart from the first and the second input shafts;
    a second intermediate shaft mounted apart from the first and the second input shafts;
    an output shaft mounted apart from the first intermediate shaft and transmitting power from the first intermediate shaft and the second intermediate shaft to a final reduction gear of a differential apparatus;
    a motor/generator fixedly connected to a transmission housing and coupled to the first input shaft;
    a continuously variable shifting device operably connecting the first input shaft to the first intermediate shaft;
    a first shifting gear set including a drive gear fixedly mounted on the second input shaft, and a driven gear fixedly mounted on the second intermediate shaft and engaged with the drive gear;
    a second shifting gear set including a forward speed drive gear rotatably mounted on the second intermediate shaft, and a forward speed driven gear fixedly mounted on the first intermediate shaft and engaged with the forward speed drive gear;
    a third shifting gear set including a reverse speed drive gear rotatably mounted on the second intermediate shaft, and a reverse speed driven gear fixedly mounted on the output shaft and engaged with the reverse speed drive gear; and
    a fourth shifting gear set including an intermediate output gear fixedly mounted on the first intermediate shaft, and an intermediate input gear fixedly mounted on the output shaft and engaged with the intermediate output gear.

7. The power transmitting apparatus of claim 6, wherein the forward speed drive gear and the reverse speed drive gear are selectively and operably connected to the second intermediate shaft by a synchronizer.

8. The power transmitting apparatus of claim 6, wherein the continuously variable shifting device includes a primary pulley fixed to the first input shaft and a secondary pulley fixed to the first intermediate shaft, and wherein the primary pulley and the secondary pulley are engaged to each other.

9. A power transmitting apparatus of a vehicle, the power transmitting apparatus comprising:
- a first input shaft selectively connectable to an engine output through a first clutch;
- a second input shaft enclosing a portion of the first input shaft and selectively connectable to the engine output through a second clutch;
- a first intermediate shaft mounted apart from the first and the second input shafts;
- a second intermediate shaft mounted apart from the first and the second input shafts;
- an output shaft mounted apart from the first intermediate shaft and transmitting power from the first intermediate shaft and the second intermediate shaft to a final reduction gear of a differential apparatus;
- a motor/generator fixedly connected to a transmission housing and coupled to the first intermediate shaft;
- a continuously variable shifting device operably connecting the first input shaft to the first intermediate shaft;
- a first shifting gear set including a drive gear fixedly mounted on the second input shaft, and a driven gear fixedly mounted on the second intermediate shaft and engaged with the drive gear;
- a second shifting gear set including a forward speed drive gear rotatably mounted on the second intermediate shaft, and a forward speed driven gear fixedly mounted on the first intermediate shaft and engaged with the forward speed drive gear;
- a third shifting gear set including a reverse speed drive gear rotatably mounted on the second intermediate shaft, and a reverse speed driven gear fixedly mounted on the output shaft and engaged with the reverse speed drive gear; and
- a fourth shifting gear set including an intermediate output gear fixedly mounted on the first intermediate shaft, and an intermediate input gear fixedly mounted on the output shaft and engaged with the intermediate output gear.

10. The power transmitting apparatus of claim 9, wherein the forward speed drive gear and the reverse speed drive gear are selectively and operably connected to the second intermediate shaft by a synchronizer.

11. The power transmitting apparatus of claim 9, wherein the continuously variable shifting device includes a primary pulley fixed to the first input shaft and a secondary pulley fixed to the first intermediate shaft, and wherein the primary pulley and the secondary pulley are engaged to each other.

* * * * *